Dec. 7, 1954  S. G. TREPP  2,696,452
FLOOR OR WALL COVERING OR THE LIKE AND
METHOD OF MANUFACTURING SAME
Filed June 29, 1950

INVENTOR.
Samuel G. Trepp.
BY H. F. Kirkpatrick
ATTORNEY

2,696,452

FLOOR OR WALL COVERING OR THE LIKE AND METHOD OF MANUFACTURING SAME

Samuel G. Trepp, Dedham, Mass., assignor to Bird & Son, inc., East Walpole, Mass., a corporation of Massachusetts Application June 29, 1950, Serial No. 171,182

7 Claims. (Cl. 154—95)

This invention relates to floor or wall covering of the hard surface type and more particularly concerns a decorative floor or wall covering of this type in which the decoration is protected by a clear transparent wear-resistant film or coating. The invention embraces a practical and economical method of manufacturing the covering as well as the covering itself.

By protecting the decoration in the manner indicated, it is possible to employ designs of much finer detail and to use colors and color combinations not heretofore considered feasible in such coverings.

My covering is particularly distinguished in that the decorative design is printed or otherwise affixed to the unexposed side of the transparent film and in that the film is separated from the backing by an opaque layer which serves as the ground for the design. In its preferred embodiment the invention utilizes a vinyl resin as the wear-resistant film and a backing of asphalt-saturated felt. The vinyl resin may be a homopolymer of vinyl acetate, vinyl chloride or vinylidine chloride, for example, or it may represent a copolymer of any of these with any of the others or with another monomer copolymerizable therewith, e. g., ethyl maleate, methyl acrylate, methyl methacrylate, acrylonitrile, styrene and the like. The resin may be plasticized with substantially any of the available plasticizers, it being preferable, however, to use plasticizers having low volatility and low migration tendencies in order that the plasticizing effect will be longer lasting. In general, best results are obtained when the plasticizer content does not exceed 20 to 30% of the total weight of the resin and plasticizer.

A film (or coating) laid down from a vinyl organosol must be heated to a temperature sufficiently high to fuse the resin in order that the film will have adequate strength. The time required to dry and fuse the resin varies widely depending on the formulation of the organosol. In some cases the entire operation may be effected in a matter of one or two minutes, while in other cases, where the solids content of the organosol is relatively low, a drying period of upwards of two hours may be necessary. The necessity for the fusion step will be readily appreciated when it is considered that the resin in an organosol is not in a dissolved state but is in the form of discrete particles which, at ordinary drying temperatures, exhibit little tendency to coalesce. On increasing the temperature to the point indicated, the particles flow together to form a smooth, coherent continuous layer of uniform thickness.

The decorated side of the surface film may be supplied with a prime coat, whenever necessary, to promote better adhesion of the surface film and opaque coating. As exemplary of a suitable prime coat may be mentioned a vinyl chloride-vinyl acetate copolymer in which a portion of the acetate groups have been converted by hydrolysis into free hydroxyl groups.

It is not only preferable but, as a practical matter, essential when the opaque layer is deposited from an organosol that such layer be applied to the surface film rather than the backing if the backing is an asphalt-impregnated felt, because in such case should the opaque layer be applied to the backing, the asphalt will bleed through the layer at the fusion temperature into contact with the decoration.

The surface film may be formed according to any of a number of procedures known in the art, such as casting either from solution or from an organosol, calendering or extruding. Preferably, the film is cast from an organosol onto a carrier sheet, because by this method films of relatively greater area may be expeditiously produced using high molecular weight polymers and copolymers which provide an extremely tough and highly wear-resistant surface.

Utilizing a film cast on a carrier sheet, it is my practice to decorate the film while the same is still on the sheet, particularly where the decoration is effected by means of a high speed printing technique, as represented by rotogravure printing, for instance. With this procedure, the plastic layer suffers a minimum of strain during application of the decoration. Care should be exercised in selecting the inks or colors used in the decorating, as these must necessarily be of a type showing good adhesion to the film.

The coating, serving as the ground for the decoration, is also preferably of vinyl composition, the necessary opacity being imparted through the incorporation of one or more pigments of selected color. Alternatively, the opaque coating may be laid down from a latex dispersion, for example. In either event, the wet coating is best deposited on the decorated side of the vinyl surface film rather than on the backing because, if deposited on the backing, the use of a transparent adhesive in the subsequent joining of the dried coating and film is required and such adhesives are relatively costly compared to those which can be used to secure the backing to the dried coating when the coating is deposited on the film.

The base material, of course, does not need to be asphalt-saturated felt, but may be any other material possessing the requisite properties. The base material operates to improve the ease of handling and application of the covering, imparts dimensional stability, provides a measure of resilience and further serves to hide surface irregularities in the floor or wall over which the covering is placed.

Using an asphalt-saturated felt base, the same is preferably supplied on its surface over which the transparent surface film and opaque coating are laid with one or more layers of a suitable undercoat paint of the type employed in the manufacture of conventional hard surface floor coverings. The laminate combining the surface film and the opaque coating may be joined to the backing by means of any suitable adhesive. Due to the opaque coating, dark colored adhesives, such as those comprising asphalt, can be employed without adverse effect on the decorative design. It is also possible to use adhesives which are not light-stable, since the opaque coating serves to exclude essentially all light from the adhesive.

For convenience, my invention in its preferred embodiment will be described with the aid of the accompanying diagrammatic drawings in which.

Figure 1:
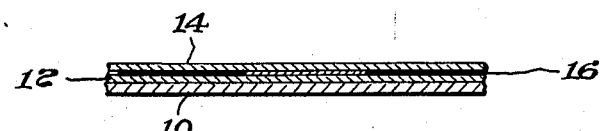
Fig. 1 is a fragmentary section showing the surface film and opaque coating as applied to a carrier sheet.
Figure 2:
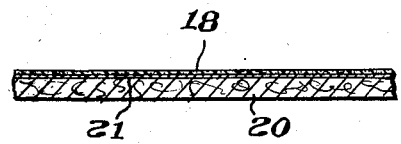
Fig. 2 is a fragmentary section through the thickness of an undercoated asphalt-saturated felt base, the base being provided with a layer of an adhesive.

In the drawings, the carrier sheet, surface film and opaque coating are indicated by the numerals 10, 12 and 14, respectively. The checkerboard design 16 is printed on the face of the film 12 representing the unexposed face in the finished covering, the carrier sheet lending support to the film during the printing. The adhesive 18, by means of which the surface film and opaque coating are joined to the felt backing 20, may be applied to the opaque coating rather than over the undercoat 21, as shown.

Figure 3:
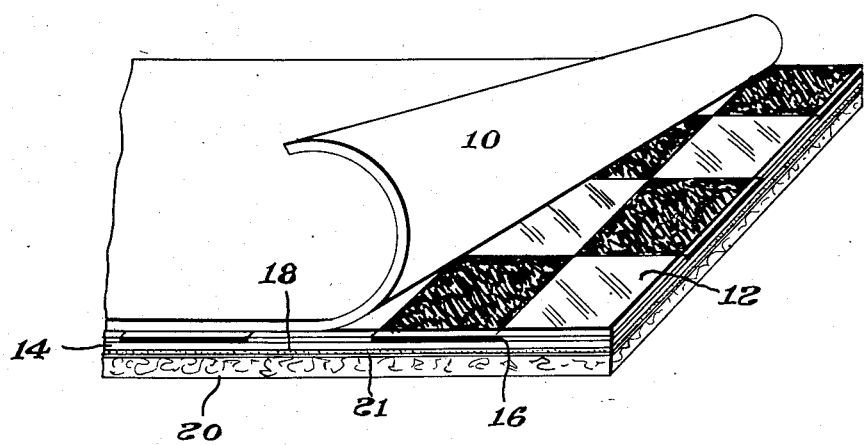
Fig. 3 is an isometric view showing the carrier sheet in the process of being stripped from the covering.

After the adhesive has set, the sheet 10, which may be formed of paper, is peeled off (Fig. 3) and the covering subjected to a finishing operation to impart a high polish to the surface film. In this operation the covering is passed through a pair of calender rolls, the roll contacting the surface film being heated. The covering may be either made in the desired size or cut to size.

Detailed practices of the invention are further illustrated by the following examples, which are not to be taken as in any way limiting the scope of the invention:

Example 1

18 parts of vinyl chloride-vinyl acetate copolymer (87% vinyl chloride, 13% vinyl acetate) having a molecular weight of about 10,000 were dissolved with 25 parts of plasticizer in 60 parts of diisobutyl ketone. To the polymer solution was added with agitation a mixture of 25 parts xylene, 15 parts of straight run petroleum naphtha having a boiling range of 240 to 290° F., and one part of a light and heat stabilizer for polyvinyl materials. The resulting solution was mixed with 82 parts of finely divided vinyl chloride-vinyl acetate copolymer (96% vinyl chloride, 4% vinyl acetate) having a molecular weight of about 25,000 and the mixture milled for 16 hours in a glass jar using stainless steel balls. The organosol thus obtained was applied in a 10-mil wet film to casting paper and dried at 150° F. for 2 hours. Fusion of the dried film was accomplished in 20 seconds at 355° F. The final film thickness was 6½ mils. The film was printed by the rotogravure process using a vinyl solution type ink.

An opaque coating was prepared as follows: 100 parts of vinyl chloride-vinyl acetate copolymer (87% vinyl chloride, 13% vinyl acetate) and 40 parts plasticizer were dissolved at 150° F. in 350 parts of thinner. The thinner consisted of 40 parts methyl isobutyl ketone, 10 parts methyl n-amyl ketone, 40 parts toluene and 10 parts xylene. 268 parts of a titanium dioxide type pigment were added to the resin solution and the mixture ball-milled 16 hours.

The coating was applied to the surface film and dried one hour at 150° F. The dry coating had a thickness of approximately 1.7 mils.

The printed and coated wear-resistant layer was combined with a base material consisting of asphalt-saturated felt which had been given two coats of emulsified oil undercoat paint. The first coat was applied at the rate of 50 pounds per 100 sq. yds. (wet basis) and the second coat at the rate of 25 pounds per 100 sq. yds. The adhesive used in the combining operation consisted of 100 parts of a copolymer of butadiene and acrylonitrile (approximately 75% butadiene, 25% acrylonitrile) thickened with 0.4 parts methyl cellulose. It was applied at the rate of 6.2 pounds per 100 sq. yds. of undercoated felt base (wet basis) and was dried 10 minutes at 150° F. During the combining operation a roll heated to 200° F. supplied heat to the wear-resistant surface. On completion of the operation and after the adhesive had cooled sufficiently, the casting paper was stripped off and returned to process.

Example 2

A covering was prepared as described in Example 1 except that an extruded film of polyvinylidene chloride was used for the surface layer. The film had a thickness of about 2 mils.

Example 3

A covering was prepared according to the method described in Example 1 with the exception that a pigmented organosol was used for the opaque coating. This organosol was prepared by dispersing 10 parts titanium dioxide in the same organosol employed for the transparent wear-resistant layer. The thickness of the opaque coating was about 4 mils.

The material was combined to a base consisting of paper sheeting impregnated with 25% synthetic rubber of the butadiene-styrene type and having a caliper of 20 mils. The butadiene-acrylonitrile copolymer adhesive described in Example 1 above was employed in the combining operation.

This product was cut into 9" tiles suitable for application to either walls or floors.

Example 4

A wear-resistant surface film was prepared using the vinyl organosol described in Example 1. The film was decorated by printing in a rotary press. Before application of the opaque coating a prime coat was applied over the decoration. This prime coat was prepared by dispersing 25 parts titanium dioxide and 5 parts antimony oxide in a solution of 13 parts modified vinyl chloride-vinyl acetate copolymer in which a portion of the acetate groups have been converted by hydrolysis into free hydroxyl groups in a solvent mixture made up of 20 parts methyl isobutyl ketone, 5 parts methyl n-amyl ketone, 20 parts toluene and 5 parts xylene. The prime coat was applied as a 1-mil wet film which was dried at 150° F.

The opaque coating was made up as follows: using a cone mill, 73.2 parts of titanium dioxide were dispersed in 26.4 parts of water, 0.2 part ammonium hydroxide and 0.2 part wetting agent. 20 parts of the dispersion were added to 100 parts of a latex representing a copolymer of vinyl chloride and vinylidene chloride and 2 parts of ammoniacal casein.

The pigmented latex dispersion was applied over the prime coat as a 2-mil wet film and was dried at 200° F.

Example 5

A product was prepared as described in Example 1, but an adhesive made up by blending 90 parts of asphalt having a ring and ball melting point of 200° F. with 10 parts of polyisobutylene was used in place of the butadiene-acrylonitrile copolymer.

I claim:

1. Method of preparing a dimensionally stable decorative floor or wall covering or the like which comprises casting a transparent wear-resistant vinyl film onto a carrier sheet from an organosol, heat-curing the film, decorating the film on the side opposite the carrier sheet, said side representing the underside of the film in the finished covering, coating the decorated side of the film with a pigmented vinyl organosol, heat-curing the coating, adhesively bonding the whole to a flexible backing of asphalt saturated felt and stripping off the carrier sheet.

2. A dimensionally stable floor or wall covering or the like combining a transparent wear-resistant surface film decorated on its underside and a flexible backing masked by an opaque coating interposed between the said film and the backing and adhesively bonded to the latter, said film comprising a synthetic thermoplastic resin as its principal component.

3. A dimensionally stable floor or wall covering or the like combining a transparent wear-resistant vinyl surface film decorated on its underside and a flexible asphalt-saturated felt backing masked by an opaque vinyl coating interposed between the said film and the backing and adhesively bonded to the latter, said film having been derived from an organosol.

4. A dimensionally stable floor or wall covering or the like combining a transparent wear-resistant vinyl surface film printed with a decorative design on its underside and a flexible asphalt-saturated felt backing masked by a pigmented vinyl coating interposed between the said film and the backing and adhesively bonded to the latter, both said film and said coating having been derived from an organosol.

5. Method of preparing a dimensionally stable decorative floor or wall covering or the like which comprises forming on a carrier member a transparent wear-resistant surface film comprising a synthetic thermoplastic resin as its principal component, decorating the exposed side of the film, said side representing the underside of the film in the finished covering, adhesively bonding the film to a flexible backing through an opaque coating serving as a ground for the decoration, and subsequently stripping the bonded film and backing from the carrier member.

6. Method of preparing a dimensionally stable decorative floor or wall covering or the like which comprises forming on a carrier member a transparent wear-resistant surface film comprising a synthetic thermoplastic resin as its principal component, decorating by printing the exposed side of the film, said side representing the underside of the film in the finished covering, coating the decorated side of the film with a pigmented organosol comprising a synthetic thermoplastic resin, curing the coating by the application of heat, adhesively bonding the whole to a flexible backing, and subsequently stripping the bonded film and backing from the carrier member.

7. Method of preparing a dimensionally stable decorative floor or wall covering or the like which comprises casting a transparent wear-resistant film of thermoplastic resin onto a carrier sheet from an organosol, heat-curing the film, decorating by printing the film on the side opposite the carrier sheet, said side representing the underside of the film in the finished covering, coating the decorated side of the film with a pigmented organosol comprising a synthetic thermoplastic resin, curing the coating by the application of heat, adhesively bonding the whole to a flexible backing of asphalt-saturated felt and stripping off the carrier sheet.

References Cited in the file of this patent

UNITED STATES PATENTS

| Number | Name | Date |
|---|---|---|
| 1,999,413 | Hemming et al. | Apr. 30, 1935 |
| 2,013,611 | Kaufmann | Sept. 3, 1935 |
| 2,215,595 | Saunders | Sept. 24, 1940 |
| 2,353,717 | Francis | July 18, 1944 |
| 2,374,940 | Kemmler et al. | May 1, 1945 |
| 2,455,777 | Jones | Dec. 7, 1948 |
| 2,459,279 | Holden | Jan. 18, 1949 |
| 2,559,649 | Little et al. | July 10, 1951 |
| 2,562,711 | Gessler et al. | July 31, 1951 |
| 2,571,962 | Smith et al. | Oct. 16, 1951 |
| 2,618,580 | Lancaster | Nov. 18, 1952 |